(12) United States Patent
Hoinkhaus et al.

(10) Patent No.: US 12,202,309 B2
(45) Date of Patent: Jan. 21, 2025

(54) METHOD FOR CHANGING A RIDE HEIGHT POSITION OF A MOTOR VEHICLE USING AN ACTIVELY ADJUSTABLE CHASSIS

(71) Applicant: Continental Automotive Technologies GmbH, Hannover (DE)

(72) Inventors: Hermann Hoinkhaus, Burgwedel (DE); Frank Wolters, Süpplingenburg (DE)

(73) Assignee: Continental Automotive Technologies GmbH, Hannover (DE)

( * ) Notice: Subject to any disclaimer, the term of this patent is extended or adjusted under 35 U.S.C. 154(b) by 74 days.

(21) Appl. No.: 18/319,707

(22) Filed: May 18, 2023

(65) Prior Publication Data

US 2023/0373263 A1 Nov. 23, 2023

(30) Foreign Application Priority Data

May 18, 2022 (DE) ................... 10 2022 204 970.5

(51) Int. Cl.
*B60G 17/018* (2006.01)
*B60G 17/016* (2006.01)
*B60G 17/019* (2006.01)

(52) U.S. Cl.
CPC ......... *B60G 17/018* (2013.01); *B60G 17/016* (2013.01); *B60G 17/019* (2013.01);
(Continued)

(58) Field of Classification Search
CPC .. B60G 17/018; B60G 17/016; B60G 17/019; B60G 2400/25; B60G 2500/30; B60G 2600/14; B60G 2600/182; B60G 2600/68
See application file for complete search history.

(56) References Cited

U.S. PATENT DOCUMENTS 4,770,438 A * 9/1988 Sugasawa ........ B60G 17/01941
188/266.7
5,555,173 A * 9/1996 Campbell ............ B60G 17/016
701/37

(Continued)

FOREIGN PATENT DOCUMENTS

DE 102015203062 A1 8/2016
DE 102015011517 B3 9/2016

OTHER PUBLICATIONS

German Office Action dated Dec. 19, 2022 for the counterpart German Patent Application No. 10 2022 204 970.5.

*Primary Examiner* — Toan C To

(57) ABSTRACT

A method for changing a ride height position of a motor vehicle comprises measuring a respective relative distance of a vehicle superstructure from corresponding wheels, with spring travel sensors and transmitting a respective spring travel signal to an electronic open-loop and closed-loop control device of the motor vehicle. The spring travel signals pass through a frequency filtering in the electronic open-loop and closed-loop control device The frequency filtering initially comprising a bandpass filtering which splits the spring travel signal into a signal component excited by the wheel and a signal component excited by the vehicle superstructure. The signal component excited by the vehicle superstructure is filtered out, the frequency filtering then comprising an absolute value conversion of the bandpass-filtered spring travel signal and subsequently a low-pass filtering.

11 Claims, 3 Drawing Sheets

(52) U.S. Cl.
CPC ...... *B60G 2400/25* (2013.01); *B60G 2500/30* (2013.01); *B60G 2600/14* (2013.01); *B60G 2600/182* (2013.01); *B60G 2600/68* (2013.01)

(56) References Cited

U.S. PATENT DOCUMENTS

| | | | |
|---|---|---|---|
| 5,732,370 A * | 3/1998 | Boyle | B60N 2/525 267/136 |
| 11,642,929 B2 * | 5/2023 | Lee | B60G 17/0165 701/37 |
| 2009/0062984 A1 * | 3/2009 | Poilbout | B60G 17/018 701/37 |
| 2016/0244065 A1 | 8/2016 | Wagner | |
| 2017/0066298 A1 | 3/2017 | Allgayer et al. | |

\* cited by examiner

METHOD FOR CHANGING A RIDE HEIGHT POSITION OF A MOTOR VEHICLE USING AN ACTIVELY ADJUSTABLE CHASSIS

TECHNICAL FIELD

The embodiments relates to a method for changing a ride height position of a motor vehicle using an actively adjustable chassis.

BACKGROUND

Methods for ride height control of a motor vehicle are well known. The ride height position of the motor vehicle is adjusted in a situation-dependent manner by detecting the motor vehicle height in relation to the roadway by means of a corresponding sensor system. In this regard, after loading of the motor vehicle for example, ride height compensation may be carried out or the motor vehicle is lowered during travel in order to save fuel.

Such ride height control can be implemented, for example, by an air suspension system as a constituent part of an actively adjustable chassis. The main components of the air suspension system are air springs, which are filled with compressed air and spring-mount the vehicle superstructure, and an air supply device, which provides the compressed air. These two components are connected to one another via pneumatic lines. Moreover, a variety of sensors, such as height and pressure sensors, and a control unit, which is functional as a control and evaluation device, are provided. Electromagnetic switching valves, which are actuated by the control unit in order to control the throughflow of the compressed air, are provided in the pneumatic lines. The sensors and the switching valves are connected to the control unit via electrical lines.

The air suspension system therefore allows the height/ride height of the vehicle superstructure in relation to the roadway to be actively changed by opening and closing certain switching valves. According to requirements, the air springs are filled with or emptied of compressed air in order to adjust the vehicle ride height. Height means the distance of the vehicle superstructure from the roadway. Since the distance of the vehicle superstructure from the roadway at the axles of the motor vehicle can be different, the term ride height is also used.

A chassis sensor is generally used in order to determine the current ride height position of the motor vehicle, said chassis sensor detecting the spring travel of the wheel as an unsprung mass in relation to the vehicle superstructure as a sprung mass. Such a chassis sensor is fitted in the region of the wheel suspension or the spring-damper unit of the motor vehicle in order to determine the spring travel of the wheel in relation to the vehicle superstructure. Such chassis sensors are also referred to as height sensors, vertical sensors, ride height sensors or spring travel sensors. The spring travel sensor transmits its signal to an electronic open-loop and closed-loop control device of the motor vehicle, the signal being processed further in said open-loop and closed-loop control device.

For example, document DE 10 2015 011 517 B3 discloses a method for determining the current ride height position of a motor vehicle, in which method the ride height position is determined by means of a distance between at least one wheel support of the motor vehicle and a superstructure of the motor vehicle, the distance being ascertained by means of a signal detected by at least one chassis sensor, the signal detected by the at least one chassis sensor at least comprising signal components which correspond to the motor vehicle's own movement and signal components which correspond to an excitation by a roadway currently being driven on by the motor vehicle, and the signal components of the motor vehicle's own movement being filtered out of the signal detected by the at least one chassis sensor by means of at least one filter function, and the current ride height position of the motor vehicle being calculated by means of a difference between a correspondingly filtered signal without the signal components corresponding to the vehicle's own movement and the signal detected by the at least one chassis sensor. This method is used to ascertain a current ride height position of the motor vehicle when traveling on an uneven stretch of road. Provision is made here for a signal ascertained by a chassis sensor, such as a spring travel sensor for example, which signal represents or comprises both an effect of the uneven stretch of road on the vehicle and the vehicle's own movement, to be filtered in such a way that only the components caused by the effect of the uneven road remain in the signal. Provision is also made for the filtered signal to be used in order to calculate a difference from a corresponding raw signal, which is supplied by the chassis sensor, and to infer the current ride height position of the vehicle from the calculated difference.

Therefore, an actively adjustable chassis can be used to respond to an uneven roadway in order to increase the travel safety and the travel comfort. This is because, when the motor vehicle is moving on an uneven roadway, these unevennesses are transmitted into the vehicle superstructure as vibrations via the wheel and the spring-damper unit. This leads to a dynamic behavior of the vehicle superstructure, such as rolling and pitching for example, said dynamic behavior not only being uncomfortable for the vehicle occupants but also having an adverse effect on the travel safety.

SUMMARY

A method for changing a ride height position of a motor vehicle comprises using an actively adjustable chassis, the chassis comprising a number of spring-damper units with associated spring travel sensors, the respective spring-damper units being arranged between a vehicle superstructure of the motor vehicle and an allocated wheel of the motor vehicle, the spring travel sensors measure a respective relative distance of the vehicle superstructure from the corresponding wheels, the spring travel sensors transmitting a respective spring travel signal to an electronic open-loop and closed-loop control device of the motor vehicle, the spring travel signals passing through a frequency filtering in the electronic open-loop and closed-loop control device, the frequency filtering initially comprising a bandpass filtering which splits the spring travel signal into a signal component excited by the wheel and a signal component excited by the vehicle superstructure and the signal component excited by the vehicle superstructure being filtered out, the frequency filtering then comprising an absolute value conversion of the bandpass-filtered spring travel signal and subsequently a low-pass filtering.

Provision is made to feed the spring travel signal of a spring travel sensor to a frequency filtering which initially comprises a bandpass filtering, then an absolute value conversion and subsequently a low-pass filtering. The spring travel signal is split into two signal components by the bandpass filtering. A first signal component is created by the excitation of the wheel when traveling over the roadway. This is the signal component of the spring travel signal that is relevant for assessing a roadway condition. A second signal component of the spring travel signal is produced by the superstructure vibrations of the motor vehicle body. This signal component is filtered out of the spring travel signal because it otherwise corrupts the assessment of the roadway condition. The condition of the roadway substantially means the evenness or unevenness of the roadway. That is to say the road state or the road quality which is caused by potholes, protrusions, ruts or for example also gravel. However, this also includes roadway properties, such as for example wet conditions, ice or snow and further types of condition not listed.

In order that the roadway condition is assessed, the bandpass-filtered signal is converted into absolute values. As a result, the signal component of the wheel is enhanced for the subsequent assessment. Therefore, the absolute value conversion of the bandpass-filtered spring travel signal is configured to amplify the signal component of the spring travel signal that is excited by the wheel.

In order that individual signal deflections do not lead to premature identification of a poor roadway condition, the bandpass-filtered signal converted into absolute values is further subjected to a low-pass filtering, so that the signal is smoothed. Therefore, the low-pass filtering is configured to smooth the amplified signal component of the spring travel signal that is excited by the wheel.

Identification of the roadway condition is rendered possible owing to the type of frequency filtering with subsequent bandpass filtering, absolute value conversion and low-pass filtering.

In order to be able to respond to the roadway driven over by the motor vehicle using an active chassis in a situation-dependent manner, rapid evaluation of the spring travel signals is therefore required. Owing to such an evaluation of the spring travel signals, a poor section of road can be identified, whereupon the vehicle superstructure is raised by a ride height control process, for example. Owing to the higher ground clearance, the risk of the vehicle superstructure coming into contact with the roadway is reduced, as a result of which damage is avoided.

According to an embodiment, this is achieved in that the spring travel signals of at least two spring travel sensors are compared with one another and, when a predetermined threshold value is overshot, the overshooting is fed to an arbiter which triggers a control intervention for changing the ride height position of the motor vehicle.

If spring travel signals of at least two spring travel sensors are compared with one another and fed to the filter analysis, a certain degree of a roadway condition can be inferred when a predetermined threshold value is overshot. Any damage due to contact between the vehicle bottom and the roadway is avoided by way of subsequent ride height adjustment of the vehicle superstructure to a higher ride height. Here, a ride height position of the motor vehicle is to be understood to mean the height or the distance of the vehicle superstructure from the roadway. This height or this ride height can be changed by operating the actively adjustable chassis.

According to a further embodiment, provision is made for the spring travel signals of two spring travel sensors associated with a front axle of the motor vehicle to be compared with one another and, if the larger signal of these two spring travel signals overshoots a first predetermined threshold value allocated for this comparison, for this overshooting to then be fed to the arbiter. The spring travel signals of two spring travel sensors associated with the front axle of the motor vehicle preferably pass through the frequency filtering, before the comparison for the larger signal is carried out.

For example, different conditions of the left-hand track and right-hand track can be inferred by way of evaluating and comparing the spring travel signals of two spring travel sensors associated with the front axle of the motor vehicle.

According to a further embodiment, provision is made for a first absolute spring travel differential travel signal for a front axle to be calculated from the spring travel signals of two spring travel sensors associated with the front axle of the motor vehicle, and a second absolute spring travel differential travel signal for a rear axle to be calculated from the spring travel signals of two spring travel sensors associated with the rear axle of the motor vehicle, the first absolute spring travel differential travel signal being compared with the second absolute spring travel differential travel signal and, if the larger signal of these two absolute spring travel differential travel signals overshoots a second predetermined threshold value allocated for this comparison, this overshooting then being fed to the arbiter. The first absolute spring travel differential travel signal and the second absolute spring travel differential travel signal preferably pass through the frequency filtering, before the comparison for the larger signal is carried out.

For example, pitching of the motor vehicle, which is caused by an uneven roadway, can be inferred by comparing the front axle with the rear axle of the motor vehicle using the spring travel signals of the respective spring travel sensors with corresponding frequency filtering.

In a further embodiment, provision is made for a first absolute spring travel differential travel signal for a front axle to be calculated from the spring travel signals of two spring travel sensors associated with the front axle of the motor vehicle, and a second absolute spring travel differential travel signal for a rear axle to be calculated from the spring travel signals of two spring travel sensors associated with the rear axle of the motor vehicle, and, if an absolute axle differential travel signal consisting of these two spring travel differential travel signals overshoots a third predetermined threshold value allocated for this comparison, for this overshooting to then be fed to the arbiter. The frequency filtering is preferably carried out on the axle differential travel signal after this axle differential travel signal has been calculated from the spring travel signals of the front axle and the rear axle.

For example, torsion of the vehicle superstructure, which is caused by a particularly poor section of road, can be inferred by comparing the spring travel signals of all the spring travel sensors of the motor vehicle.

A further embodiment makes provision, when the first and/or the second and/or the third threshold value are/is overshot, for the arbiter to make a decision about a target ride height for the ride height position of the motor vehicle that is dependent on the overshooting, and to trigger the control intervention.

For example, when all three threshold values are overshot, the arbiter chooses a higher target ride height than if only one of the three threshold values is overshot. This serves for travel safety in the case of a particularly uneven roadway.

The method is used in a motor vehicle having an actively adjustable chassis and an electronic open-loop and closed-loop control device by means of which the method is carried out.

The actively adjustable chassis is preferably embodied as an air suspension system. In the air suspension system, compressed air is conveyed into the air springs or let out from said air springs in order to change the ride height position. The air suspension system may work in the closed air supply mode, it being possible for compressed air to be displaced between the air springs and a pressure accumulator.

BRIEF DESCRIPTION OF THE DRAWINGS

Further embodiments are provided by the following description of an exemplary embodiment with reference to the figures, in which.

DETAILED DESCRIPTION

Figure 1:
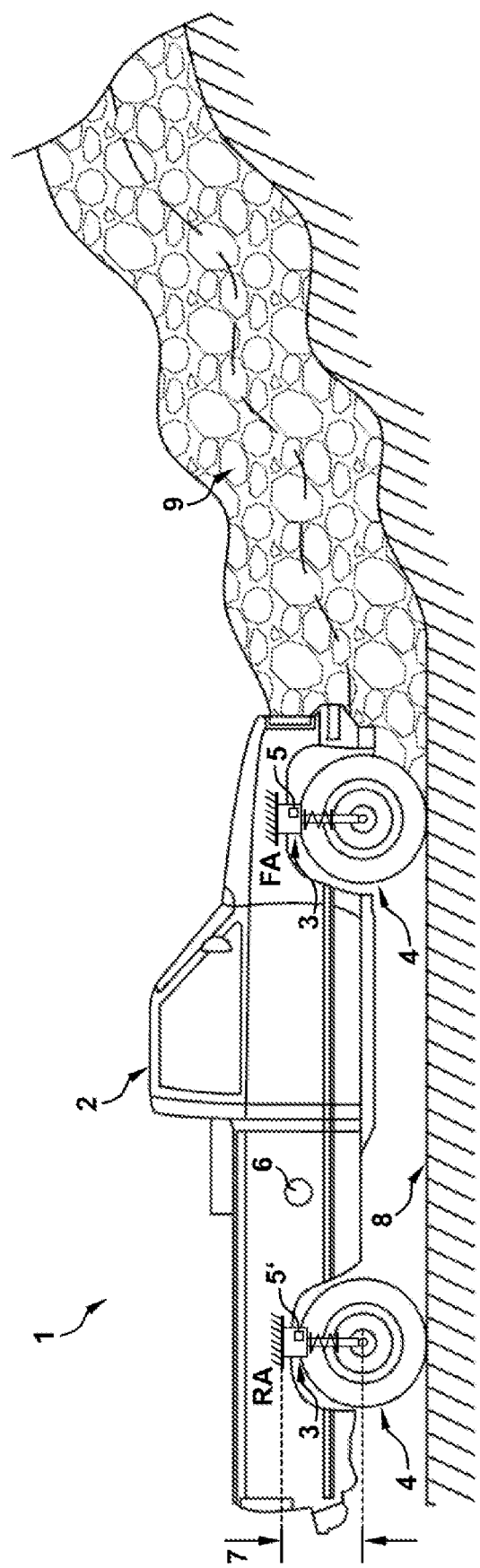
FIG. 1 shows a motor vehicle on a roadway.

FIG. 1 schematically shows a motor vehicle 1 which moves by way of its wheels 4 on a roadway 8 with a specific condition 9. The motor vehicle 1 comprises a vehicle superstructure 2 which is spring-mounted as a sprung mass in relation to wheels 4 as unsprung masses by a plurality of spring-damper units 3. Respective spring travel sensors 5 and 5' are associated with the spring-damper units 3 of the front axle (FA) and the rear axle (RA). It goes without saying that two spring-damper units 3 with respective spring travel sensors 5 and 5' are provided on each axle (FA; RA) of the motor vehicle 1.

A distance 7 of the motor vehicle 1 or the vehicle superstructure 2 from the roadway 8 is measured using spring travel sensors 5 and 5'. Since the distance 7 is measured at the two axles (RA; FA), the term ride height position is also used. The signals of spring travel sensors 5 and 5' are fed to an electronic open-loop and closed-loop control device 6 of the motor vehicle 1, said signals being processed within said open-loop and closed-loop control device.

Figure 2:
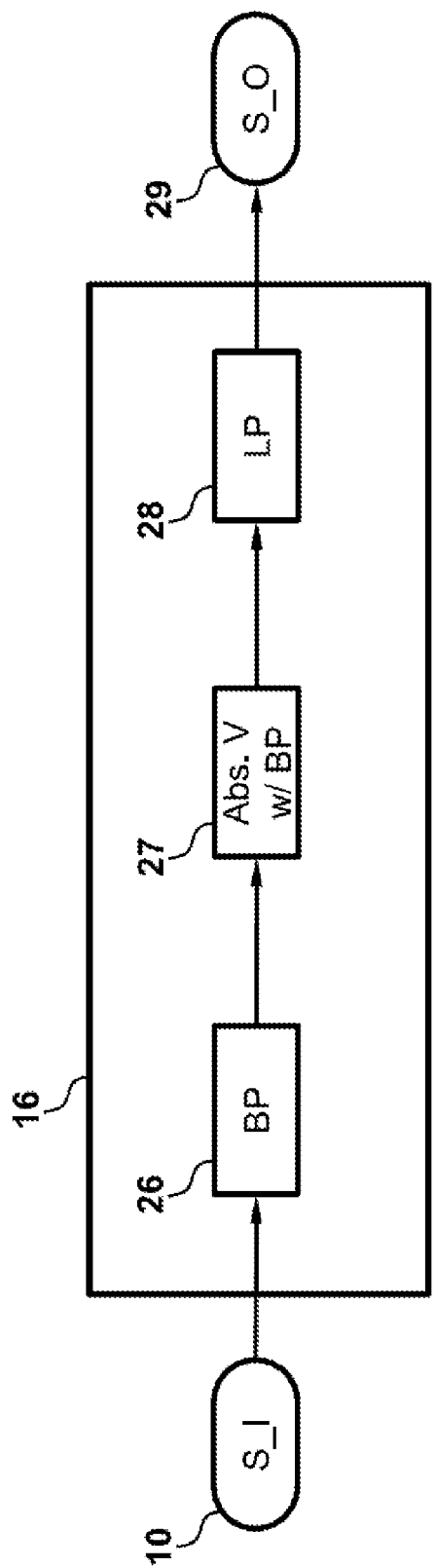
FIG. 2 shows an exemplary frequency filtering of a spring travel signal.

The processing of the spring travel signals is described with reference to FIG. 2. FIG. 2 schematically shows the processing of a spring travel signal 10 of a spring travel sensor as an input signal by a frequency filtering 16. Frequency filtering 16 of the spring travel signal 10 as an input signal leads to a filtered spring travel signal 29 as an output signal.

The spring travel signal 10 from a spring travel sensor represents the vertical change in a corner of the vehicle superstructure in relation to the roadway. Said signal contains radiofrequency signal components on the basis of the excited frequency of the wheel due to traveling over the roadway and low-frequency signal components on the basis of the vibration frequency of the spring-mounted vehicle superstructure.

The signal component of the excited wheel natural frequency is intended to be analyzed more precisely by means of frequency filtering 16 in order to assess the roadway condition. In a first step, the spring travel signal 10 is split by a bandpass filter 26 into a signal component which is excited by the wheel and a signal component which is excited by the vehicle superstructure. The signal component excited by the vehicle superstructure is filtered out of the spring travel signal 10.

If a dominating signal component is established in the region of the wheel natural frequency, this signal component is subjected to a further filtering in order to be able to provide better information about the roadway condition. Therefore, in a second step, after bandpass filtering 26, the signal component of the wheel is processed further by way of the negative half-cycles of the bandpass-filtered spring travel signal being converted into positive half-cycles, so that said signal component is enhanced.

Finally, the signal once again passes through a low-pass filter 28, so that no single deflection negatively influences the identification of the roadway and the bandpass-filtered and enhanced spring travel signal is smoothed.

A filtered spring travel signal 29, which provides information about the roadway condition, is then produced as an output signal. Therefore, the roadway condition traveled over by the motor vehicle is rapidly ascertained by exemplary frequency filtering 16 of the spring travel signal 10, so that an adequate response is possible.

On the basis of this frequency filtering and a comparison of the spring travel signals of all the spring-damper units, a certain degree of a roadway condition is ascertained, to which it is possible to respond with a control intervention in the chassis of the motor vehicle. The comparison of spring travel signals of all spring-dam per units is explained in more detail using following FIG. 3.

Figure 3:
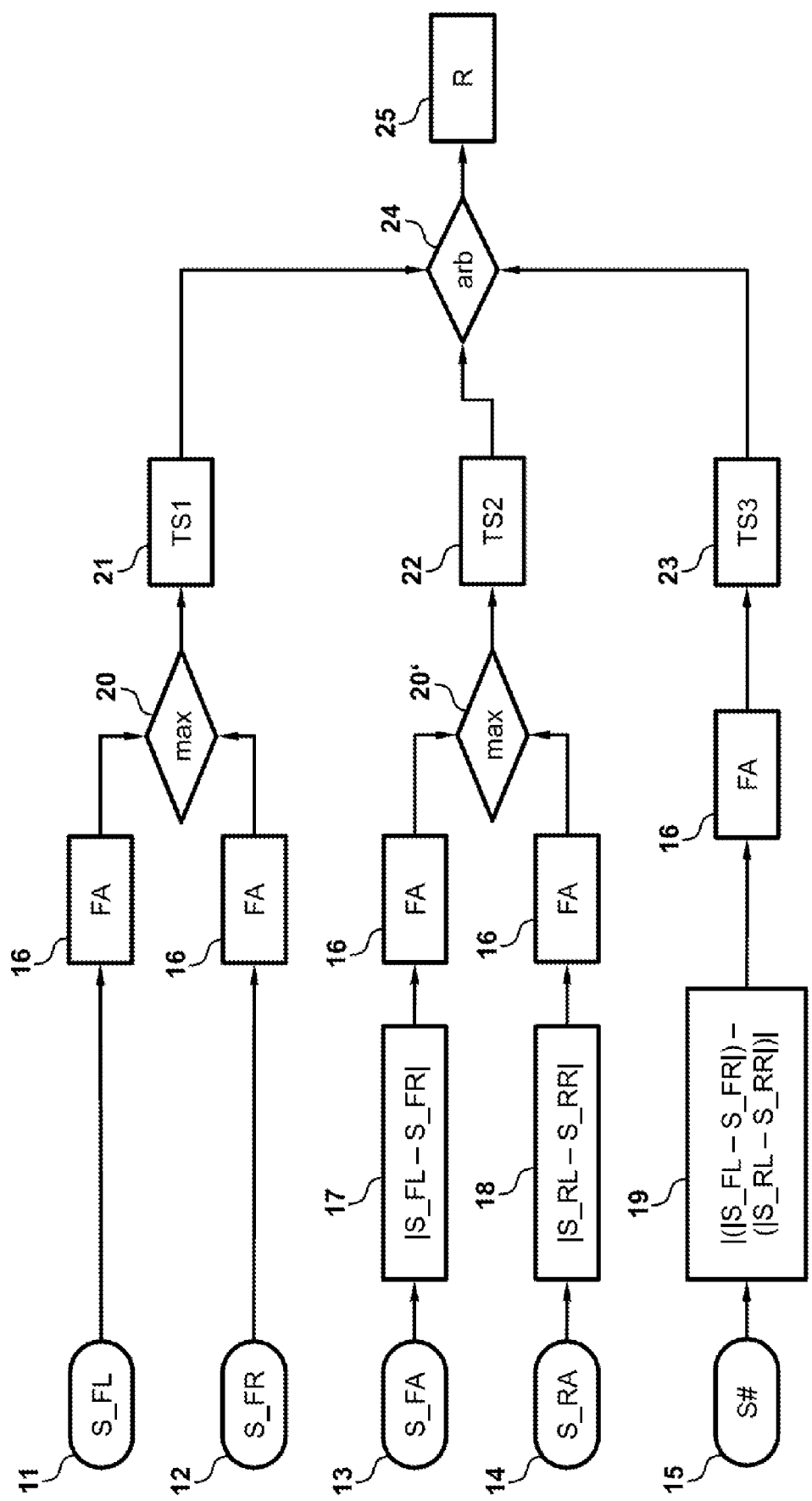
FIG. 3 shows an exemplary block diagram for processing spring travel signals.

FIG. 3 shows a block diagram of various spring travel signals which pass through the exemplary frequency analysis, are compared with one another and, if a threshold value is overshot, are fed to an arbiter 24, so that a control intervention can be carried out.

According to the example, the spring travel signals of the front axle are compared with one another in a first branch. The spring travel signal 11 of the spring travel sensor "at the front left" passes through the exemplary frequency filtering 16 as an input signal. The spring travel signal 12 of the spring travel sensor "at the front right" also passes through the exemplary frequency filtering 16 as an input signal. The respective filtered output signals of the spring travel signal 11 and the spring travel signal 12 are compared with one another in a further step 20, only the larger or the maximum signal being allowed to pass. This larger signal, that is to say either the filtered spring travel signal 11 or the filtered spring travel signal 12, is then compared with a first predetermined threshold value 21. If overshooting is found, this is fed to an arbiter 24.

According to the example, the spring travel signals of the two vehicle axles are compared with one another in a second branch. The spring travel sensor signals of the front axle 13 are initially compared with one another in one step. A first spring travel differential travel signal 17 of the spring travel signals "at the front left" and "at the front right" is formed here. This spring travel differential travel signal 17 is converted into an absolute value in the same step. The same is done for the spring travel sensor signals of the rear axle 14. In a parallel step, a second absolute spring travel differential travel signal 18 is formed from the spring travel signals "at the back left" and "at the back right".

A first and a second absolute spring travel differential travel signal 17; 18 are then each fed to the frequency filtering 16 as input signals. After frequency filtering 16, the filtered output signals are compared with one another in a further step 20', the larger signal again being compared with a second predetermined threshold value 22. In the case of overshooting, this is likewise fed to the arbiter 24.

In a third branch, all the spring travel signals 15 are fed to a comparison. In one step, the absolute axle difference 19 between the front axle and the rear axle is calculated. For this purpose, as already in the second branch, a first absolute spring travel differential travel signal is formed from the spring travel signals "at the front left" and "at the front right"

and the second absolute spring travel differential travel signal formed from the spring travel signals "at the back left" and "at the back right" is subtracted therefrom, and the absolute value is formed therefrom. The resulting axle difference travel signal 19 is fed to the frequency filtering 16 as an input signal and the filtered output signal from the axle differential travel signal 19 is compared with a third predetermined threshold value 23. If the filtered axle differential travel signal 19 overshoots the third predetermined threshold value 23, this is also fed to the arbiter 24.

The arbiter 24 is designed to make a decision depending on its three inputs 21, 22, 23 in respect of which control intervention 25 should be carried out in the chassis of the motor vehicle. Depending on the configuration, different vehicle heights or ride height positions of the vehicle superstructure are implemented when only one threshold value, two threshold values or all three threshold values is/are overshot.

A certain degree of the roadway condition, to which it is possible to adequately respond with a control process 25, is ascertained by evaluating the spring travel signals in the three branches. For example, a different condition of the roadway for the left-hand track and the right-hand track can be inferred from the comparison of the spring travel signals 11 and 12 of the front axle in the first branch. For example, rolling of the vehicle superstructure can thus be identified. For example, pitching of the vehicle superstructure, which is caused by speed bumps or the like, can be identified from the comparison of the two axles with one another in the second branch. Furthermore, given a particular roadway condition, it is also possible for the vehicle superstructure to be turned. This can be identified by the comparison of the axle difference from the third branch. The intention is to respond to all of these driving-dynamics influences, which are caused by the roadway, with a corresponding control intervention 25 in order to Increase the travel safety and the travel comfort. The control intervention 25 may be executed in such a way that the vehicle superstructure is raised.

The invention claimed is:

1. A method for changing a ride height position of a motor vehicle using an actively adjustable chassis comprising:
   measuring a respective relative distance of a vehicle superstructure from a plurality of corresponding wheels with a plurality of spring travel sensors;
   transmitting a respective plurality of spring travel signals from the plurality of spring travel sensors to an electronic open-loop and closed-loop control device of the motor vehicle;
   passing the plurality of spring travel signals through a frequency filtering in the electronic open-loop and closed-loop control device, the frequency filtering initially comprising a bandpass filtering which splits each of the plurality of spring travel signals into a signal component excited by the wheel and a signal component excited by the vehicle superstructure; and
   filtering the signal component excited by the vehicle superstructure, wherein the frequency filtering then comprises an absolute value conversion of the bandpass-filtered spring travel signal and subsequently a low-pass filtering.

2. The method as claimed in claim 1, further comprising configuring the absolute value conversion of the bandpass-filtered spring travel signal to amplify the signal component of the respective spring travel signal of the plurality of travel signals that is excited by the respective wheel.

3. The method as claimed in claim 1, wherein the low-pass filtering is configured to smooth the amplified signal component of the spring travel signal that is excited by the wheel.

4. The method as claimed in claim 1, further comprising comparing the spring travel signals of at least two spring travel sensors of the plurality of travel sensors with one another and, when a predetermined threshold value is overshot feeding the overshoot to an arbiter which triggers a control intervention for changing the ride height position of the motor vehicle.

5. The method as claimed in claim 4, comparing the spring travel signals of two spring travel sensors of the plurality of sensors associated with a front axle of the motor vehicle with one another and, if the larger signal of these two spring travel signals overshoots a first predetermined threshold value allocated for this comparison, feeding the overshoot to the arbiter.

6. The method as claimed in claim 5, wherein the spring travel signals of two spring travel sensors associated with the front axle of the motor vehicle pass through the frequency filtering, before the comparison for the larger signal is carried out.

7. The method as claimed in claim 4, further comprising;
   calculating a first absolute spring travel differential travel signal for a front axle from the spring travel signals of two spring travel sensors of the plurality of travel sensors associated with the front axle of the motor vehicle;
   calculating a second absolute spring travel differential travel signal for a rear axle from the spring travel signals of the plurality of travel sensors of two spring travel sensors associated with the rear axle of the motor vehicle;
   comparing the first absolute spring travel differential travel signal with the second absolute spring travel differential travel signal; and
   feeding an overshoot to the arbiter if the larger signal of these two absolute spring travel differential travel signals overshoots a second predetermined threshold value allocated for this comparison.

8. The method as claimed in claim 7, wherein the first absolute spring travel differential travel signal and the second absolute spring travel differential travel signal pass through the frequency filtering, before the comparison for the larger signal is carried out.

9. The method as claimed in claim 4, further comprising:
   calculating a first absolute spring travel differential travel signal of the plurality of travel signals for a front axle from the spring travel signals of two spring travel sensors of the plurality of travel sensors associated with the front axle of the motor vehicle, and
   calculating a second absolute spring travel differential travel signal for a rear axle is calculated from the spring travel signals of the plurality of travel signals of two spring travel sensors associated with the rear axle of the motor vehicle; and
   feeding an overshoot to the arbiter if an absolute axle differential travel signal consisting of these two spring travel differential travel signals overshoots a third predetermined threshold value.

10. The method as claimed in claim 9, wherein the frequency filtering is carried out on the axle differential travel signal after this axle differential travel signal has been calculated from the spring travel signals of the front axle and the rear axle.

11. The method as claimed in claim 4, further comprising deciding a target ride height with the arbiter, wherein the decision is dependent on the overshoot and triggers the control intervention.

* * * * *